US00RE34795E

United States Patent [19]

Arriazu

[11] E Patent Number: Re. 34,795

[45] Reissued Date of Patent: Nov. 22, 1994

[54] POTENTIOMETER

[75] Inventor: Jose C. L. Arriazu, Tudela, Spain

[73] Assignee: Navarra De Componentes Electronicos, S.A. (NACESA), Tudela, Spain

[21] Appl. No.: 745,013

[22] Filed: Aug. 14, 1991

Related U.S. Patent Documents

Reissue of:

[64] Patent No.: 4,792,778
Issued: Dec. 20, 1988
Appl. No.: 18,343
Filed: Feb. 24, 1987

[30] Foreign Application Priority Data

Nov. 25, 1986 [ES] Spain ..... 86/03166

[51] Int. Cl.[5] ..... H01C 10/34
[52] U.S. Cl. ..... 338/174; 338/162
[58] Field of Search ..... 338/174, 162, 163, 164, 338/165, 171

[56] References Cited

U.S. PATENT DOCUMENTS 3,470,519 9/1969 Hatch ..... 338/162

FOREIGN PATENT DOCUMENTS 453386 11/1976 Spain .
466765 1/1978 Spain .
284921 2/1985 Spain .
2100523 12/1982 United Kingdom .

*Primary Examiner*—Marvin M. Lateef
*Attorney, Agent, or Firm*—Trexler, Bushnell, Giangiorgi & Blackstone, Ltd.

[57] ABSTRACT

A potentiometer, consisting of a general cylindrical shape, on the lateral surface of which it has two parallel projections, so that the lateral terminals are located with respect to said projections, the elements it comprises (slider-holder, slider, resistant track and collector) being located inside the frame. The slider-holder is guided in the frame by setting a cut, *or depression* wherein there is a projection against which a projection of the slider-holder will butt, which has a new angular projection on which there are two pivots which will set into both holes of the slider for the fixing in-between. The slider is provided with two oval segments in an inclined position which will contact the resistant track. The slider and the collector are fixed to the slider-holder on some cuts provided therein. The slider is provided with two projections for contacting the collector, the latter having a circular crown shape.

3 Claims, 12 Drawing Sheets

A-A

B-B

C-C

D-D

FIG.11
E-F
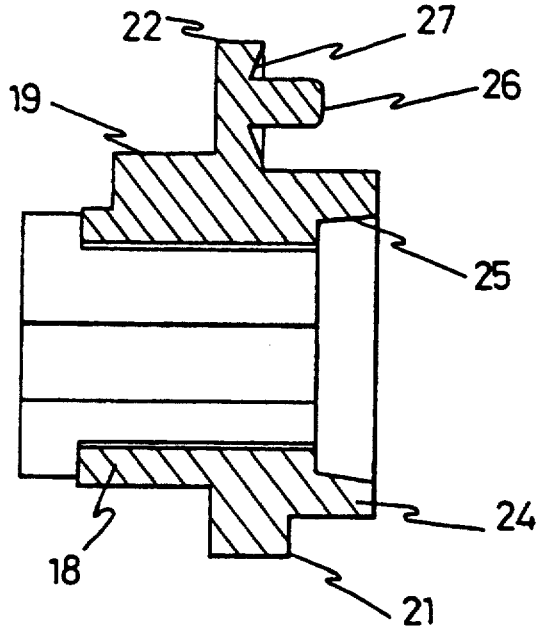
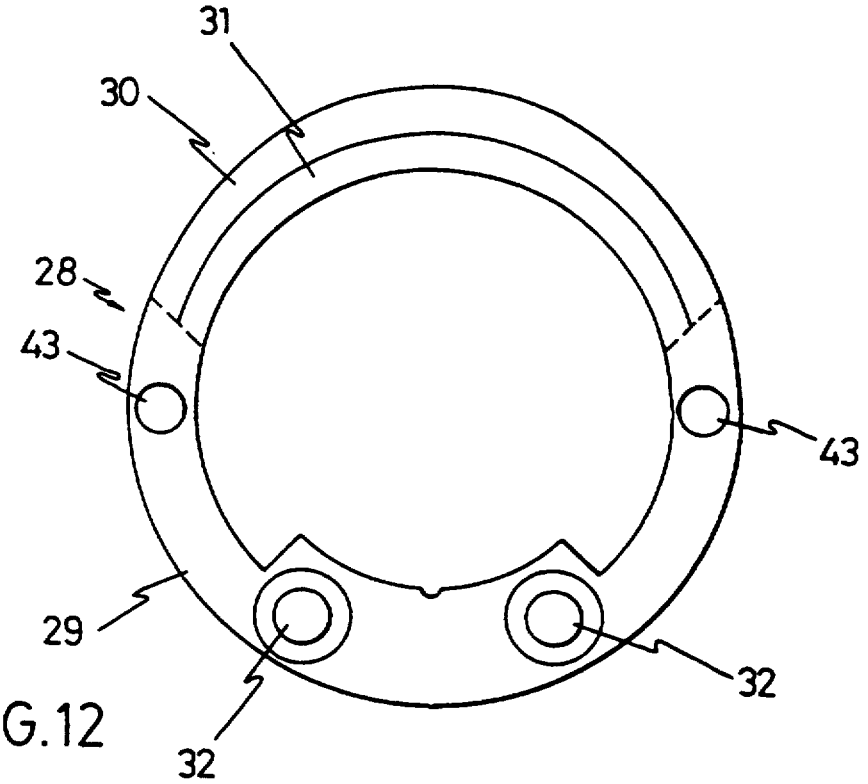
FIG.12

FIG.15
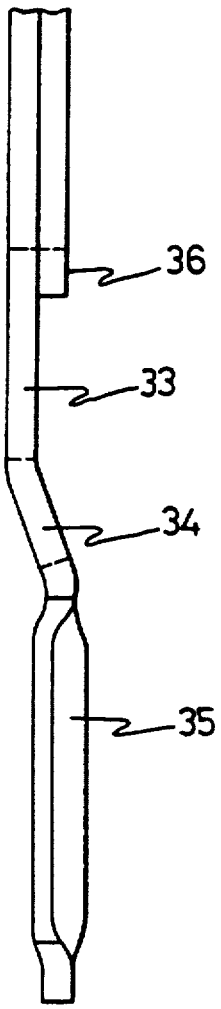
FIG.17
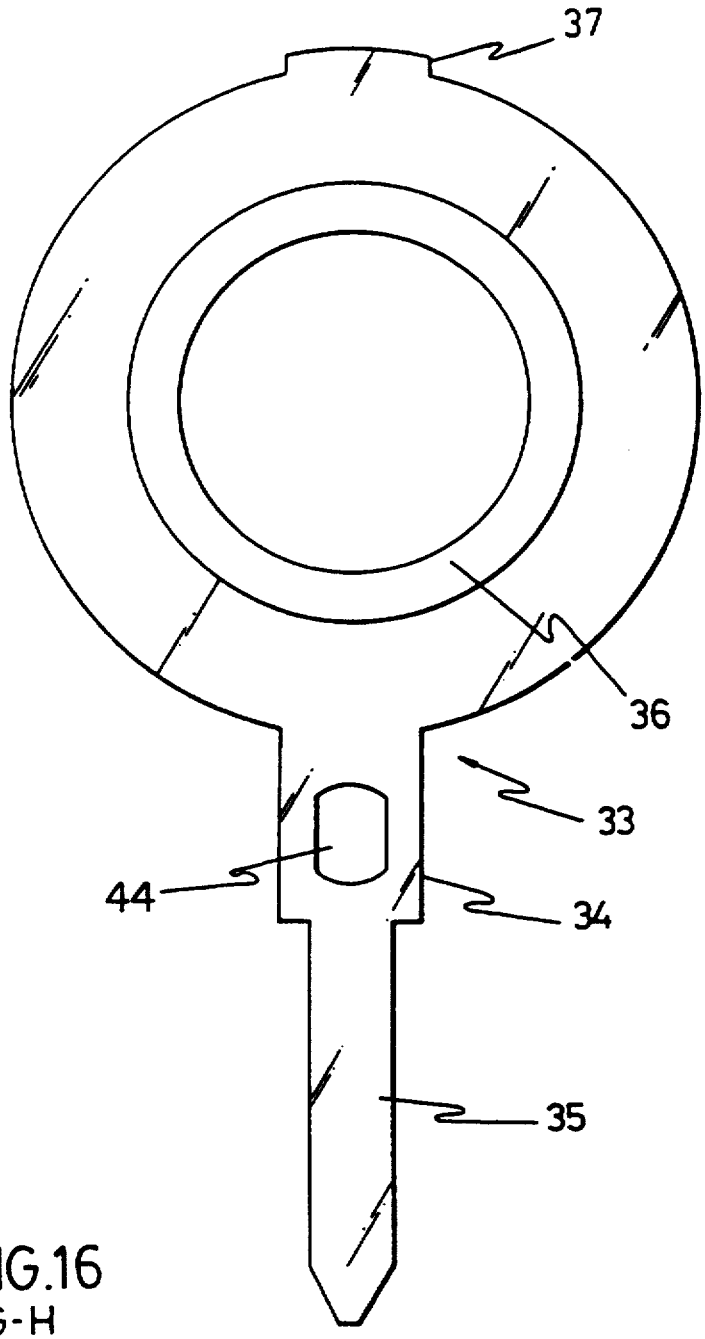
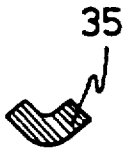
FIG.16
G-H

FIG.18
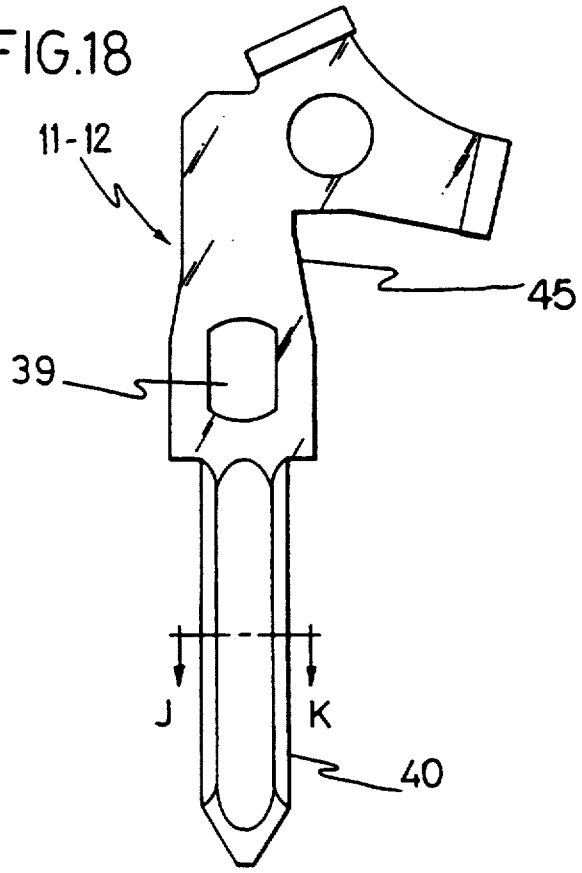
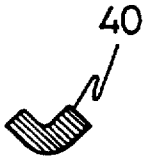
FIG.19
J - K

POTENTIOMETER

Matter enclosed in heavy brackets [ ] appears in the original patent but forms no part of this reissue specification; matter printed in italics indicates the additions made by reissue.

BACKGROUND OF THE INVENTION

Field of the Invention

The following invention, as expressed by the title of the present specification, consists of a potentiometer used for adjusting the value of the electric resistance of a circuit, displaying noticeable advantages with respect to the conventional ones.

SUMMARY OF THE INVENTION

The improvements carried out in the potentiometer object of the present specification are mainly based on the structure thereof, with which the inner location of its constituting elements, as well as the interconnection existing between elements and structure, vary.

The potentiometer comprises a generally cylindrical frame provided at the lateral surface thereof with a projection initiating with respect to an almost diametrical chord, said projection comprising lateral inward steps, the outer surface of which coincides with the end of a tongue having a circular [crow-shaped] *crown-shaped* projection, provided at the base. Laterally to said tongue the base comprises two pair of radial holes for fixing the lateral terminals which will extend by said frame steps.

The slider-holder is introduced into the frame and guided when it sets into a circular inlet. Likewise, the frame has a projection into which the slider-holder will run, thereby working as a rotation butt end.

The slider has a general shape of circular crown, according to a ground view, and is provided with two curve sections, the ends of which contact the crown by the resistant face thereof, thereby travelling along it according to a pre-established rotation angle.

In order to complete the hereinafter description and to help to a better comprehension of the characteristics thereof, the present specification has an attached set of planes in the figures of which the following has been represented:

BRIEF DESCRIPTION OF THE DRAWING

FIG. 11. It shows a sectional view according to the cut made by the E–F of FIG. 9.

FIG. 12. It shows a ground view of the plane slider, so that the zone corresponding to the elements that will contact the resistant track of the crown have an oval shape.

FIG. 15. It shows an elevational view of the collecting terminal, wherein it can be seen how the true terminal has a curve transversal section.

FIG. 16. It shows a sectional view of the terminal of FIG. 14, according to the G–H.

FIG. 17. It shows a developmental view of the collecting terminal of FIG. 14.

FIG. 18. It shows a view of the lateral terminal that is fixed to the frame by means of holes at the base thereof.

FIG. 19. It shows a sectional view of the terminal of FIG. 18, according to the cut made by J–K in FIG. 18.

DESCRIPTION OF THE PREFERRED EMBODIMENT

Figure 1:
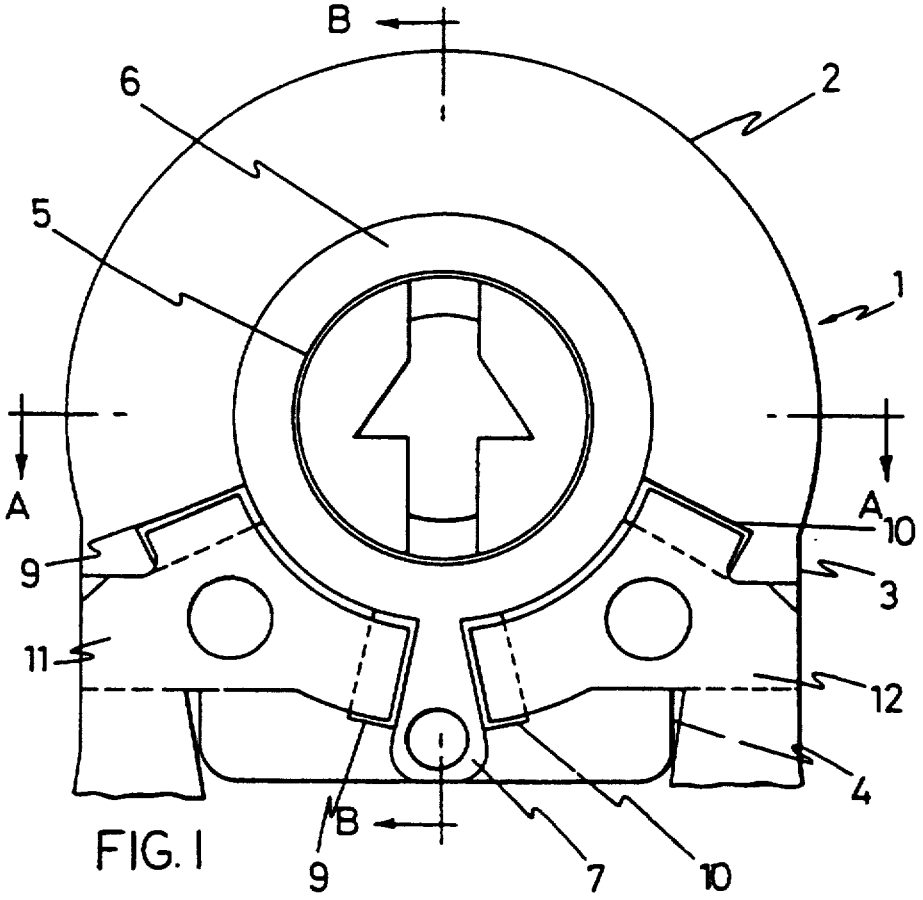
FIG. 1. It shows a ground view of the potentiometer according to the specification, wherein the lateral terminals thereto fixed can be seen.
Figure 2:
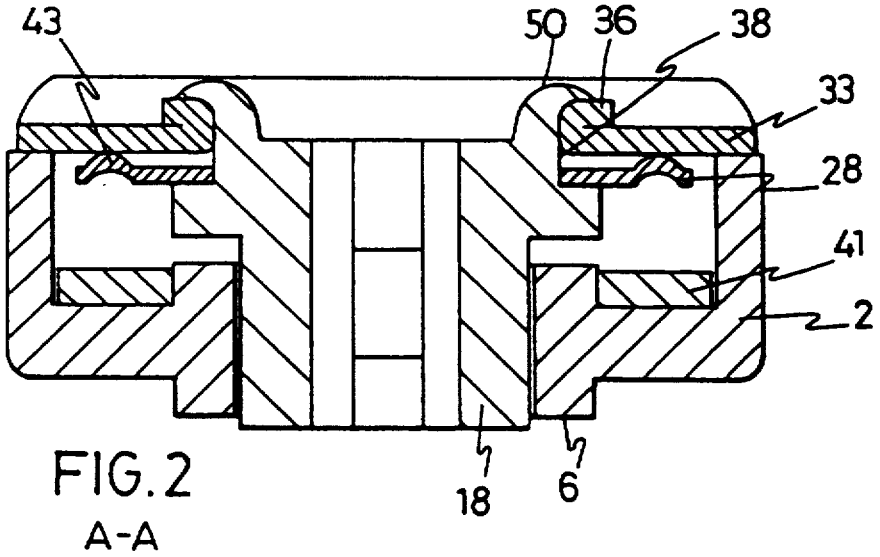
FIG. 2. It shows a sectional view of the above figure according to the diametrical axis A—A, wherein the crown, the slider-holder, the slider and the collector can be seen.
Figure 3:
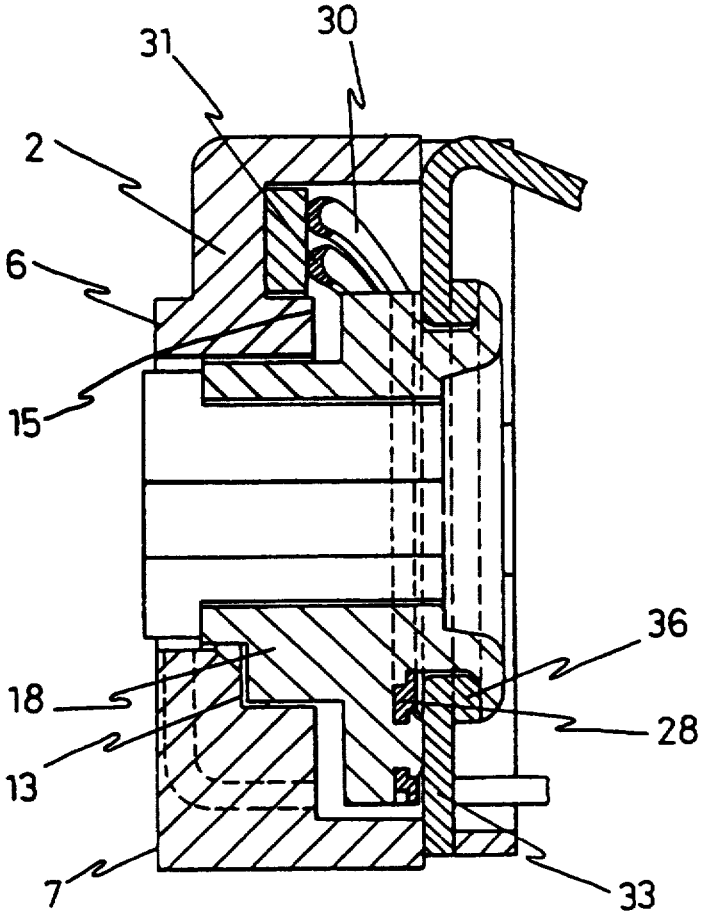
FIG. 3. It shows a sectional view of FIG. 1, according to the diametrical axis B—B, wherein it can be seen how the slider contacts the resistant track located at the frame.
Figure 4:
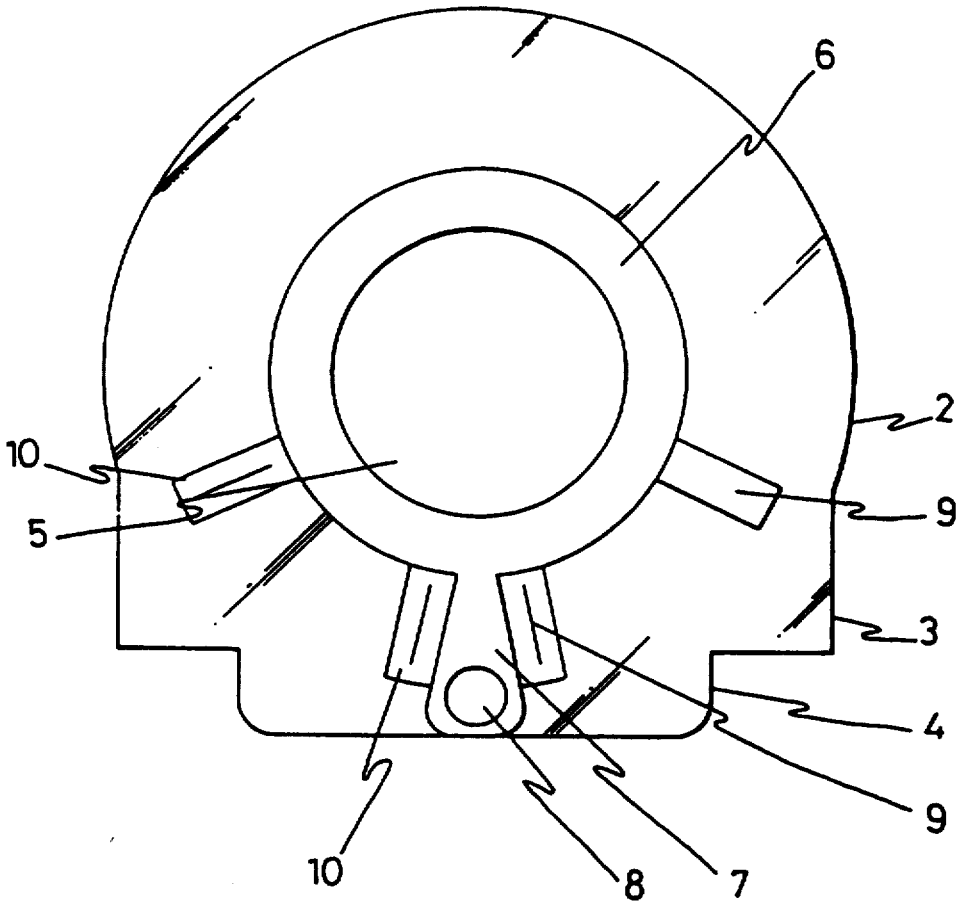
FIG. 4. It shows a ground view of the base of the potentiometer frame, wherein the circular crown-shaped projection, with the radial extension can be seen, as well as the holes wherein the lateral terminals set.
Figure 5:
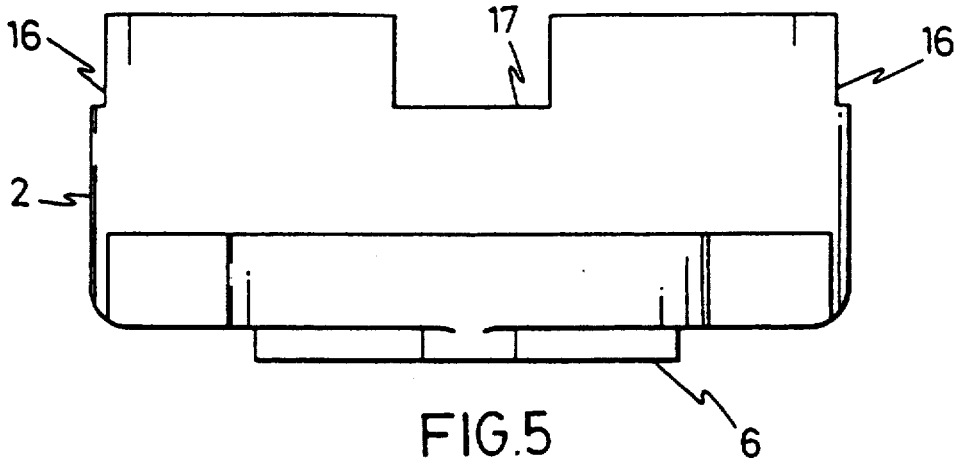
FIG. 5. It shows an elevational view of the potentiometer frame, with the projection of its base, as well as the cuts of the lateral surface thereof, in correspondence with the open base and the these ones in a number of four, orthogonally facing two to two.
Figure 6:
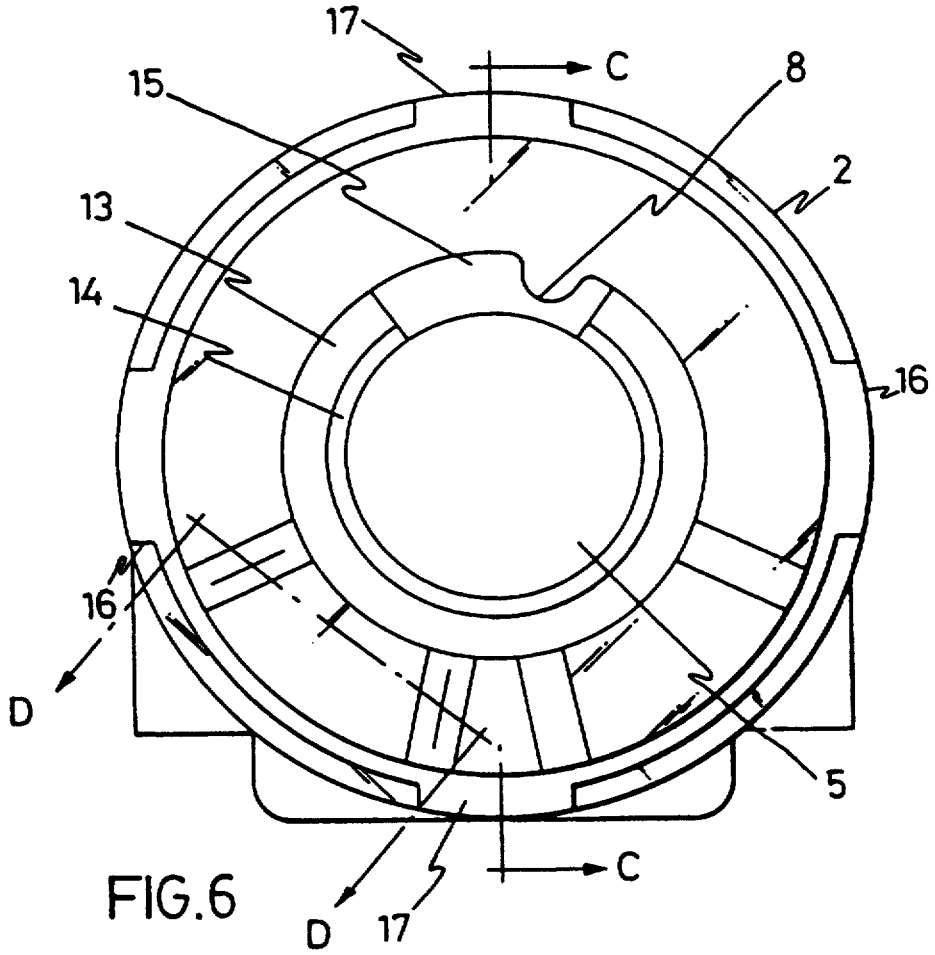
FIG. 6. It shows a ground view of the frame by the inner face of the base, showing the cuts on the lateral surface thereof being located orthogonally two to two, as well as the circular cut with the projection for the butt end of the slider in the run thereof.
Figure 7:
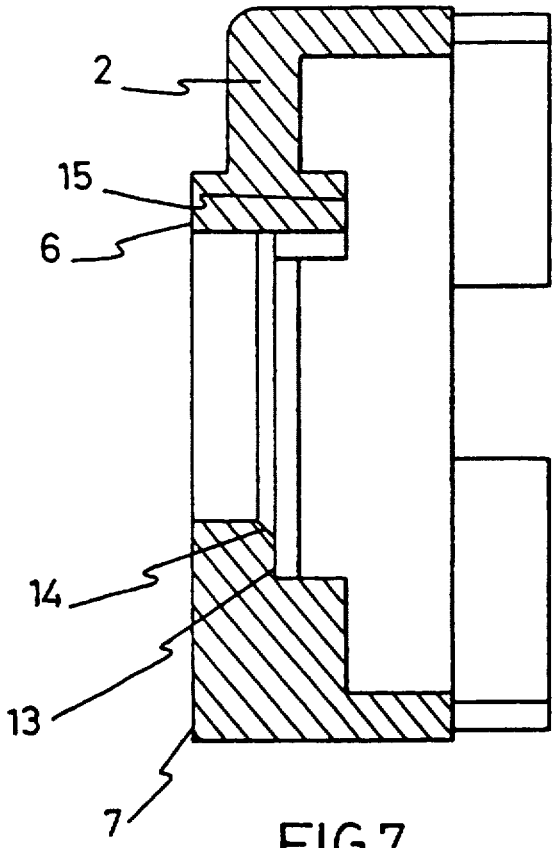
FIG. 7. It shows a sectional view according to the cut made by the diametrical axis C—C of FIG. 6.
Figure 8:
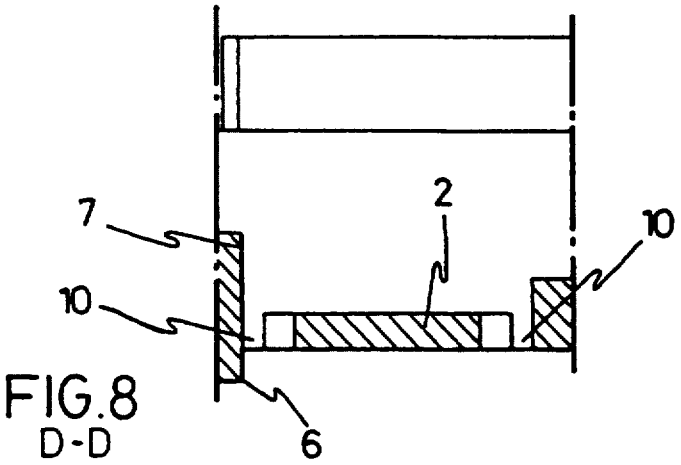
FIG. 8. It shows a sectional view according to the cut D—D of FIG. 6.
Figure 9:
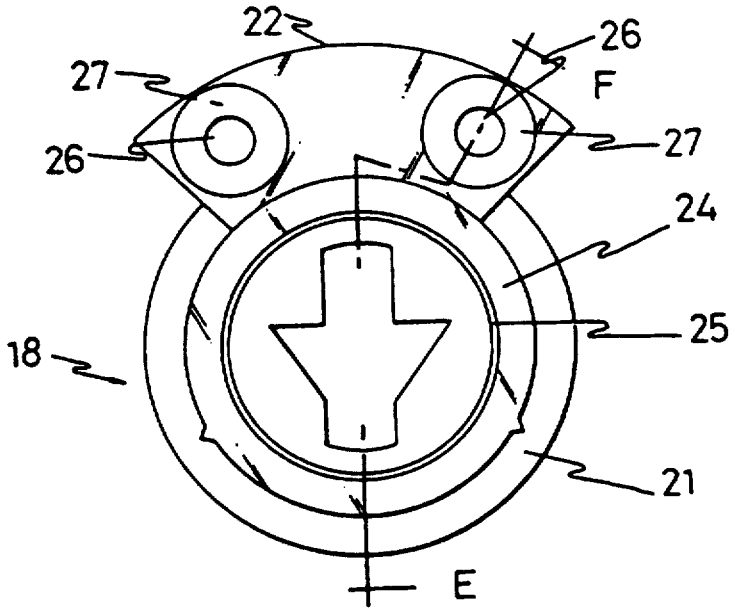
FIG. 9. It shows a ground view of the slider-holder.
Figure 10:
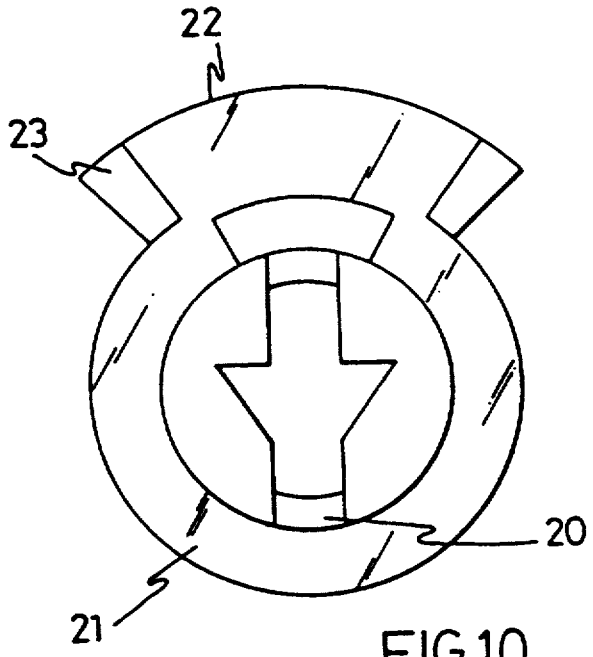
FIG. 10. It shows a ground view of the slider-holder of the previous figure, rotated 180°.
Figure 13:
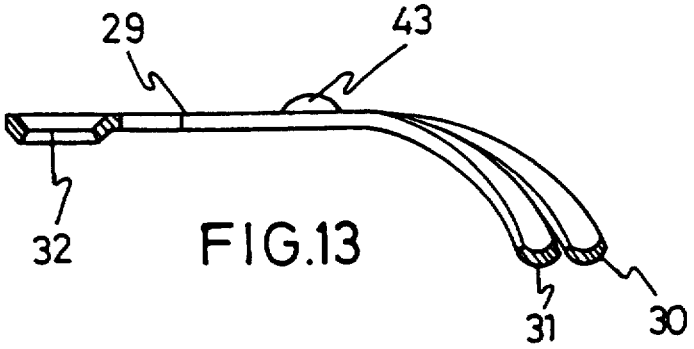
FIG. 13. It shows a lateral elevational view of the slider, wherein the elements that will contact the resistant track have been duly bent.
Figure 14:
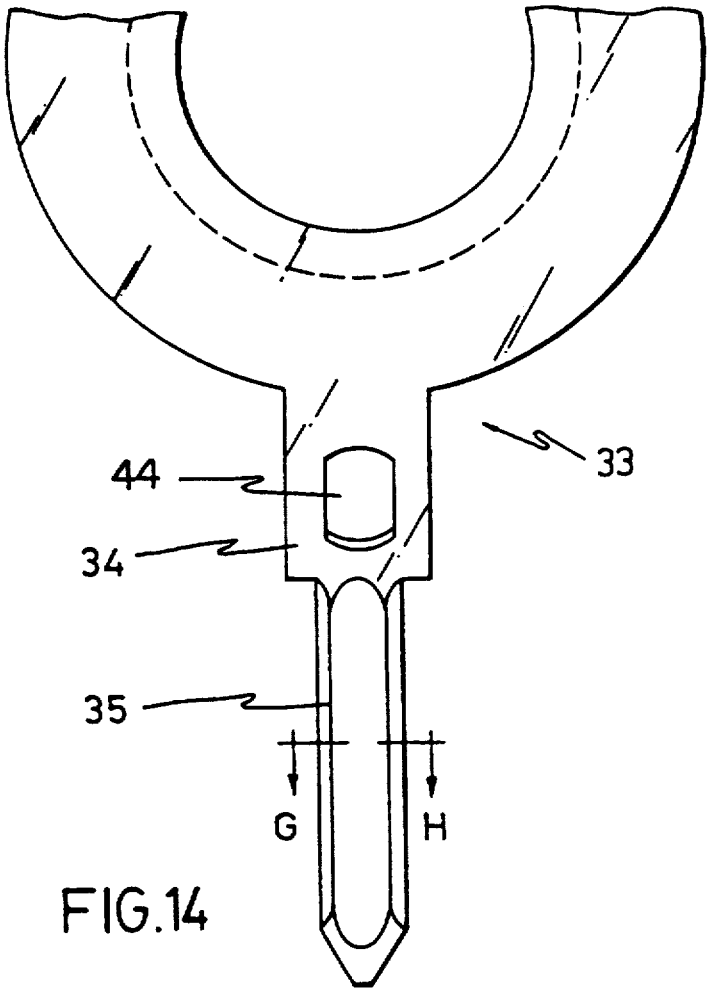
FIG. 14. It shows a view of the collecting terminal constituting the closure of the frame of the potentiometer.
Figure 20:
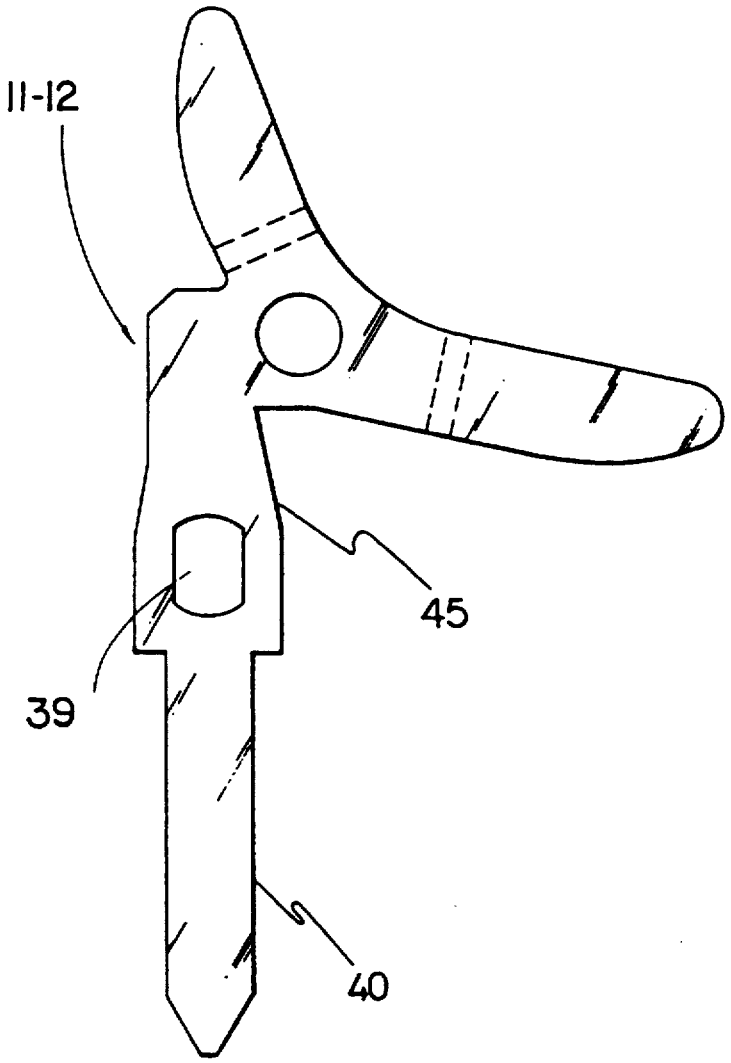
FIG. 20. It shows a view of the lateral terminal as represented in FIG. 18, in the development thereof.

In view of the above figures and according to the adopted numeration, we can see how the potentiometer 1 comprises the frame 2, inside which the necessary elements for the perfect working thereof are located, said frame having one of its bases free.

The frame 2 comprises two projections 3 at its lateral surface near one of its ends, which form the step 4. The frame 2 base has a central hole 5 perimetrically to which the projection 6 is defined, provided with an extension 7 with diverging sides, in the sense of the projections 3 of the lateral surface thereof. Likewise, on the base of the frame 2 there are two pair of holes 9 and 10, wherein the lateral terminals 11 and 12 will set.

The inner face of the frame 2 base is provided perimetrically thereto with a cut, *or depression* 13, except at a 70 degree arch, wherein there is a projection 15 with respect to the base surface, said cut 13 being provided at its free end and a bevelled cut 14. The lateral surface of the frame 2 has, with respect to its free base, two pair of cuts 16 and 17 orthogonally faced.

The slider-holder 18 will be located over the cut, *or depression* 13 of the inner face of the frame 2 base, acting as a guide in its rotation, whilst the projection 15 will make the functions of the butt end thereof, said slider-holder 18 being provided with the projection 19 and the inlet 20. By means of this inlet, one will be able to work thereon, and, due to the arrow shape thereof, it will indicated, likewise, the position of the slider. The slider-holder 18 defines the projecting plane 21 and it has thereon an angular extension 22 for positioning the slider; this extension has its ends 23 bevelled.

Likewise, the slider-holder 18 has a circular crown-shaped portion 24 with a bevel-shaped inner face 25, and on the extension 22 it is provided with some pivots 26 perimetrically to which the bevelled cuts 27 have been performed.

The slider 28 is a metallic small plate comprising a circularly shaped portion 29, slightly greater than a 180 degree angle and the remaining portion having an oval shape and formed by two segments 30 and 31, which will bent by the base thereof thereby forming a circular body according to a ground view, with the oval segments thereof being conveniently inclined. This slider 28 stands on the projection 21 of the slider-holder 18, so that the segments 30 and 31 contact the resistant track 41, both being connected by the pivots 26 which are located in the holes 32 of the slider, being rivetted, thereby restraining them from separating. Likewise, the slider 28 is provided with two projections 43 which will contact the collector 33.

By its side, the collector 33 consists of a circular crown-shaped body provided with an extension 34 forming a slight inclination, from which the curved transversal sectioned terminal 35 is configurated. The collector is provided, on the minor radius of the body thereof with circular crown shape, a perimetrical projection 36 and, at the extension 34, with a hole 44. Likewise, diametrically to the terminal, it is provided with a projection 37.

The collector 33 is fixed to the slider-holder 18 because of the cuts 38 thereof, wherein the former sets and engagement of perimetrical projection 36 and neck part 50, the collector carrying out the functions of potentiometer cover, being positioned in such a way that its extensions 34 and 37 remain on the slots 17 of the potentiometer frame 2.

The lateral terminals 11 and 12 are provided with small plates 45 by means of which they will be fixed to the pair of holes 9 and 10 of the frame 2, which terminals have a hole 39 and the true terminals 40, these having a curve transversal section.

Figure 21:
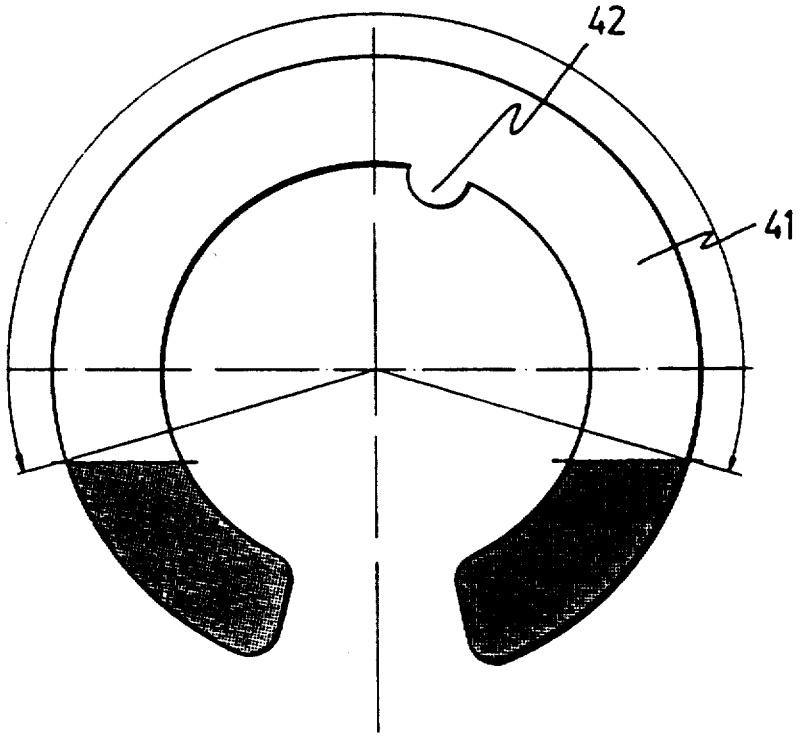
FIG. 21. It shows a view of the resistance and, specifically, of its face with the resistant track.

The resistant track 41 is on a face of an open circular crown-shaped body, having at its inner part a projection 42 corresponding to the inlet 8 which has the projection 15 of the inner face of the frame 2 base, so that the slider 28 will run the length of resistant track between the sections X and Y represented in FIG. 21.

Summing up, the patent of invention on file should fall onto the following claims:

I claim:

1. A potentiometer comprising:

(a) a frame having a circular crown-shaped depression on an inner face of a base portion;

(b) a slider-holder being guided by said depression, said slider-holder having a lateral projection which will butt against a projection on said depression for limiting rotation of said slider-holder *and a circular crown-shaped portion;*

(c) a slider connected to an angular projection on said slider-holder by means of pivots, said slider having a circular shape encompassing slightly more than 180° of [said] *a* circle, said slider comprising two oval segments;

(d) a resistance track contacting said oval segments and bending said segments into a circular shape, said resistance track having a projection extending into a corresponding depression in said frame for restraining said track from rotating; and (e) a collector attached to said slider-holder, said slider having two projections for contacting said collector*; wherein said collector comprises a circular crown-shaped body and is provided, on a minor radius of the body thereof with a circular crown shape and a perimetrical projection; and wherein said collector is fixed to said slider-holder by engagement of said perimetrical projection with a neck part formed on said circular crown-shaped portion of said slider-holder.*

2. A potentiometer according to claim 1 [wherein said collector has a circular crown shape and is joined to said slider-holder by a projection] , said collector further including two diametrically facing projections, one of said projections having a narrower width than another, said wider projection having a central extended hole for forming a terminal having a curved transverse section, said projections being held in corresponding slots in said frame.

3. A potentiometer according to claim 1 wherein lateral radially extending terminals are connected to said frame by two plates introduced into said frame through two pair of symmetrical holes, said terminals being of a curved transverse section.

* * * * *